United States Patent
Billore et al.

(10) Patent No.: US 11,134,025 B2
(45) Date of Patent: Sep. 28, 2021

(54) DYNAMIC RESOURCE ALLOCATION METHOD AND APPARATUS IN SOFTWARE-DEFINED NETWORK

(71) Applicant: Samsung Electronics Co., Ltd., Gyeonggi-do (KR)

(72) Inventors: Ashish Billore, Gyeonggi-do (KR); Sergey Dyasli, Gyeonggi-do (KR); Jonghan Park, Seoul (KR); Heetae Ahn, Gyeonggi-do (KR); Kibeom Nam, Seoul (KR)

(73) Assignee: Samsung Electronics Co., Ltd

( * ) Notice: Subject to any disclaimer, the term of this patent is extended or adjusted under 35 U.S.C. 154(b) by 94 days.

(21) Appl. No.: 15/974,088

(22) Filed: May 8, 2018

(65) Prior Publication Data
US 2018/0324106 A1    Nov. 8, 2018

(30) Foreign Application Priority Data

May 8, 2017   (KR) .......................... 10-2017-0057526

(51) Int. Cl.
*H04L 12/917* (2013.01)
*H04L 12/863* (2013.01)
(Continued)

(52) U.S. Cl.
CPC .............. *H04L 47/76* (2013.01); *H04L 47/50* (2013.01); *H04L 47/62* (2013.01); *H04L 47/781* (2013.01);
(Continued)

(58) Field of Classification Search
CPC . H04L 67/1008; H04L 67/1025; H04L 47/76; H04L 47/50; H04L 49/70;
(Continued)

(56) References Cited

U.S. PATENT DOCUMENTS 7,136,800 B1 *  11/2006  Vega ..................... G06F 9/5027
                                                  703/23
7,937,499 B1 *   5/2011  Tripathi ................. G06F 13/24
                                                  709/232

(Continued)

FOREIGN PATENT DOCUMENTS

KR       1020160108500        9/2016

OTHER PUBLICATIONS

Korean Office Action dated Jun. 7, 2021 issued in counterpart application No. 10-2017-0057526, 8 pages.

*Primary Examiner* — Muhammad Raza
(74) *Attorney, Agent, or Firm* — The Farrell Law Firm, P.C.

(57) ABSTRACT

The present disclosure relates to a 5G or pre-5G communication system to be provided for supporting a data rate higher than that of a 4G communication system such as LTE. A dynamic resource allocation method of an intelligent orchestrator in a software-defined network (SDN) according to the present invention includes acquiring operation data related to resource allocation in the SDN, adjusting at least one of virtual switch and host parameters based on the operation data and a preconfigured scheduling policy, and allocating resources dynamically according to the adjustment result.

11 Claims, 6 Drawing Sheets

(51) Int. Cl.
*H04L 12/911* (2013.01)
*H04L 12/931* (2013.01)
*H04L 12/861* (2013.01)
*H04L 29/08* (2006.01)

(52) U.S. Cl.
CPC ............ *H04L 47/822* (2013.01); *H04L 49/65* (2013.01); *H04L 49/70* (2013.01); *H04L 67/10* (2013.01); *H04L 67/1008* (2013.01); *H04L 67/1025* (2013.01); *H04L 49/9005* (2013.01)

(58) Field of Classification Search
CPC ....... H04L 47/62; H04L 47/822; H04L 67/10; H04L 49/65; H04L 47/781; H04L 49/9005; H04L 12/10; G06F 21/575; G06F 1/266; G06F 2221/033
See application file for complete search history.

(56) References Cited

U.S. PATENT DOCUMENTS

| | | | |
|---|---|---|---|
| 9,569,277 B1* | 2/2017 | Cropper | G06F 9/45558 |
| 2005/0262504 A1* | 11/2005 | Esfahany | G06F 9/5077 |
| | | | 718/1 |
| 2005/0262505 A1* | 11/2005 | Esfahany | G06F 9/5016 |
| | | | 718/1 |
| 2008/0019371 A1* | 1/2008 | Anschutz | H04L 47/10 |
| | | | 370/394 |
| 2008/0263544 A1* | 10/2008 | Amano | G06F 9/45558 |
| | | | 718/1 |
| 2009/0016220 A1* | 1/2009 | Uysal | H04L 41/5096 |
| | | | 370/232 |
| 2014/0226661 A1 | 8/2014 | Mekkattuparamban et al. | |
| 2014/0359608 A1* | 12/2014 | Tsirkin | G06F 9/45533 |
| | | | 718/1 |
| 2015/0103844 A1* | 4/2015 | Zhao | H04L 45/42 |
| | | | 370/410 |
| 2015/0169340 A1 | 6/2015 | Haddad et al. | |
| 2015/0207717 A1 | 7/2015 | Djukic et al. | |
| 2015/0334716 A1* | 11/2015 | Coffman | H04W 28/20 |
| | | | 370/237 |
| 2015/0365325 A1* | 12/2015 | Hwang | H04L 47/70 |
| | | | 370/230 |
| 2016/0261418 A1 | 9/2016 | Keene et al. | |
| 2017/0031622 A1* | 2/2017 | Nagarajan | G06F 3/0607 |
| 2017/0201574 A1* | 7/2017 | Luo | H04L 67/34 |
| 2018/0270668 A1* | 9/2018 | Nair | H04W 76/10 |
| 2018/0309748 A1* | 10/2018 | Li | H04L 63/0815 |
| 2018/0322090 A1* | 11/2018 | Tamir | G06F 15/17325 |

* cited by examiner

DYNAMIC RESOURCE ALLOCATION METHOD AND APPARATUS IN SOFTWARE-DEFINED NETWORK

CROSS-REFERENCE TO RELATED APPLICATION

This application is based on and claims priority under 35 U.S.C. § 119(a) to Korean Patent Application Serial No. 10-2017-0057526, filed on May 8, 2017 in the Korean Intellectual Property Office, the entire disclosure of which is incorporated herein by reference.

BACKGROUND

1. Field

The disclosure relates, generally, to an intelligent orchestrator, and more particularly, to an intelligent orchestrator and method that can dynamically allocate resources in a software defined network (SDN).

2. Description of the Related Art

In order to meet the increasing demand for wireless data traffic since the commercialization of $4^{th}$ generation (4G) communication systems, the development focus is on the $5^{th}$ generation (5G) or pre-5G communication system. For this reason, the 5G or pre-5G communication system is called a beyond 4G network communication system or post long-term evolution (LTE) system.

Implementation of the 5G communication system in millimeter wave (mmWave) frequency bands (e.g., 60 GHz bands) is being considered to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna.

Also, in order to enhance network performance of the 5G communication system, developments are underway of various techniques, such as evolved small cell, advanced small cell, cloud radio access network (RAN), ultra-dense network, device-to-device (D2D) communication, wireless backhaul, moving network, cooperative communication, coordinated multi-points (CoMP), and interference cancellation.

Furthermore, the ongoing research includes the use of hybrid frequency shift keying (FSK) and quadrature amplitude modulation (QAM) {FQAM} and sliding window superposition coding (SWSC) as advanced coding modulation (ACM), filter bank multi-carrier (FBMC), non-orthogonal multiple access (NOMA), and sparse code multiple access (SCMA).

Cloud computing is a computing technology for providing the users with IT-related services such as data storage, internetworking, and contents provision services via a server on the Internet. Typically, in cloud computing, information is stored in the server located on the Internet and may be downloaded and preserved temporarily in a client or IT device, such as a desktop computer, a tablet computer, a laptop computer, a netbook computer, and a smartphone. Thus, cloud computing makes it possible for a user to store user information in a server located on the Internet and access the user information anytime and anywhere with various types of IT devices.

As the browser-based network environment changes to the mobile environment, interest in multimedia cloud computing increases. For example, multimedia cloud computing may alleviate the burden of complex operations of a resource-constrained mobile device by encoding and decoding multimedia content using cloud computing resources. However, guaranteeing quality of service (QoS) is a significant issue for providing the multimedia cloud computing service. This QoS requirement may be met through efficient network management.

As one of the efficient network management technologies, a software-defined network (SDN) is a technology for controlling a network in software in such a way of separating a forwarding plane and a control plane logically for dynamic network administration.

SUMMARY

The present disclosure has been made to address at least the disadvantages described above and to provide at least the advantages described below.

Accordingly, an aspect of the disclosure provides a software-defined network (SDN) for controlling a network in software so as to separate a forwarding plane and a control plane logically for dynamic network administration.

An aspect of the disclosure provides a dynamic resource allocation method and apparatus that is capable of improving resource utilization efficiency of a software-defined network in an environment where operation conditions change frequently, such as a cloud and network function virtualization (NFV) environment capable of using 5G or later technologies.

An aspect of the disclosure provides an intelligent scheduler or intelligent orchestrator that may observe the entire network environment rather than individual nodes so as to dynamically adjust (or determine) the configurations of a virtual switch (vSwitch) and related computing hosts for optimization of the network environment.

In accordance with an aspect of the disclosure, there is provided a dynamic resource allocation method of an intelligent orchestrator in a software-defined network (SDN). The method includes acquiring operation data related to resource allocation in the SDN, adjusting at least one of a virtual switch and a host parameter based on the operation data and a preconfigured scheduling policy, and allocating resources dynamically according to a result of the adjustment.

In accordance with an aspect of the disclosure, there is provided an intelligent orchestrator for dynamically assigning resources in a software-defined network (SDN). The intelligent orchestrator includes a transceiver configured to transmit and receive signals, and a controller configured to acquire operation data related to resource allocation in the SDN, adjust at least one of a virtual switch and a host parameter based on the operation data and a preconfigured scheduling policy, and allocate resources dynamically according to a result of the adjustment.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things device (IoT) (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

In the disclosure, the term "user" may indicate a person using an electronic device or a device (e.g., an artificial intelligence electronic device) using an electronic device.

A software-defined network (SDN) makes it possible to facilitate network routing configuration, control, and administration of complex operations through software programing. For example, an SDN is capable of facilitating resource allocation, scheduling, provisioning, monitoring, and management.

Figure 1:
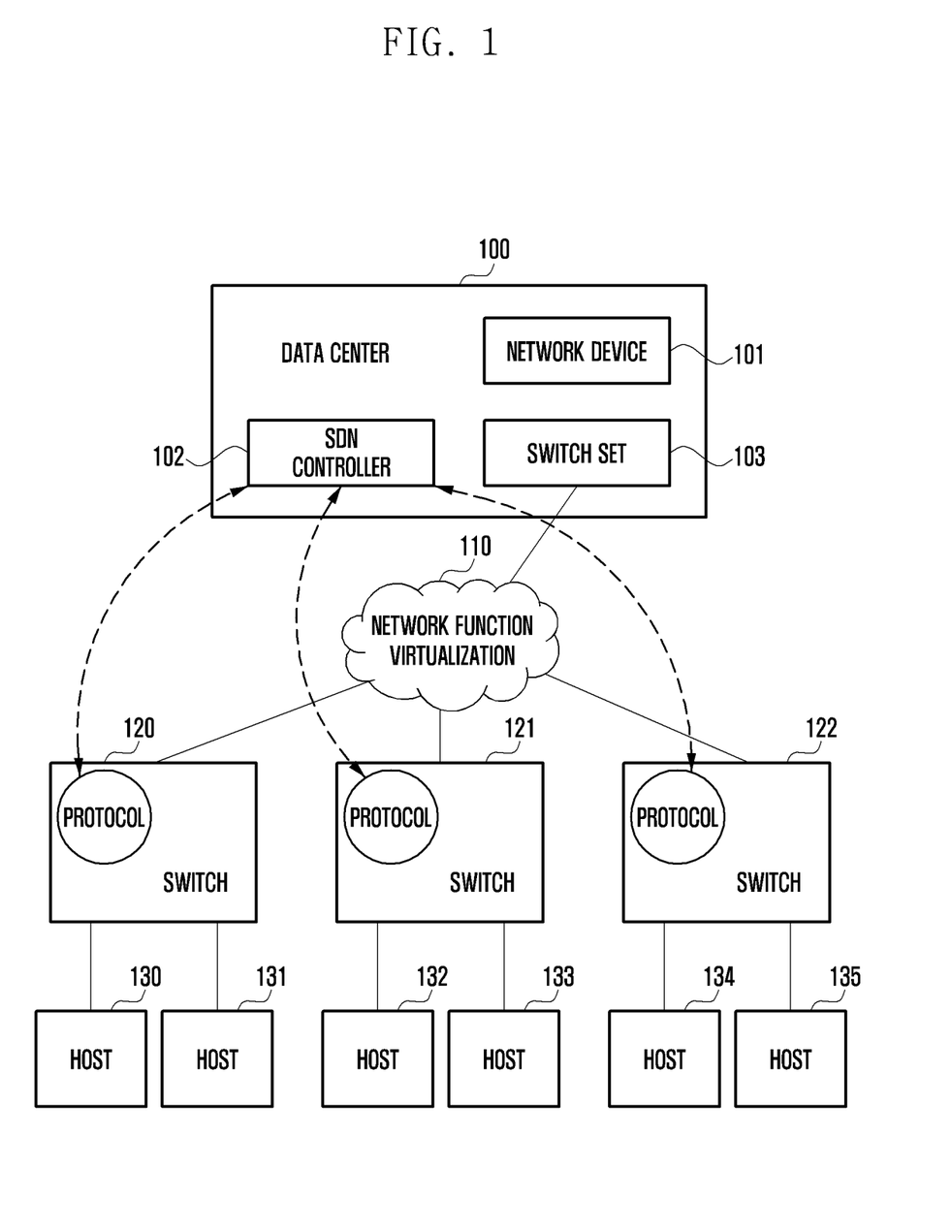
FIG. 1 is a diagram of a network system according to an embodiment.

FIG. 1 is a diagram of a network system according to an embodiment.

Referring to FIG. 1, the network system may include a data center 100, a network function virtualization (NFV) 110, switches 120, 121, and 122, and hosts 130, 131, 132, 133, 134, and 135. The data center 100 may communicate data with the hosts 130-135 via the NFV 110 and switches 120-122.

The data center 100 and/or the hosts 130-135 may include an intelligent scheduler or an intelligent orchestrator.

The NFV 110 may be implemented in the form of software compatible with hardware components necessary for configuring the communication network. The NFV 110 connects the data center 100 to the switches 120-122, and the switches 120-122 may be physical switches connected to the hosts 130-135.

The SDN architecture may implement network services customized to the business goals of the user in consideration of routing, multicast, security, access control, bandwidth management, traffic engineering, processor and storage optimization, service quality, energy usage amount, and types of policy administration. The use of an application programing interface (API) between the SDN control and application layers makes it possible for the network to provide network services and functions without being restricted by details for executing the business applications.

The OpenFlow technology provides a basis for new networking technology development by converting a legacy close-networking technology to an open-networking technology. Open networking foundation (OFN) established for promoting standardization and commercialization of the OpenFlow technology reinterprets network technologies as computing technologies and defines the SDN based on the OpenFlow technology.

The OpenFlow technology is a type of routing protocol that provides a standardized communication interface and that takes charge of communication between OpenFlow-enabled network devices, such as the SDN controller and a switch (or router).

Intelligent systems may be implemented for controlling an SDN, such as 5G or a later network infrastructure, which is in use by the cloud or Telco NFV, and the intelligent systems may be implemented in software or hardware. Furthermore, a CPU core and host memory may be utilized to execute (or implement) a software switch or virtual switch (vSwitch) that is closely interoperating with physical hardware components of the network.

However, some difficulties may arise in executing or implementing a vSwitch that provides flexibility in adjustment, optimization, and configuration. First, an overall consideration of the factors necessary in making a determination for optimized adjustment and configuration of the vSwitch in consideration of the entire network rather than of individual nodes is lacking. Second, the resource requirements for implementing enhanced functions in the vSwitch that exploit software/hardware acceleration may not be available. Third, there is lack in adaptability to operation conditions. The configuration and adjustment of the vSwitch are initially determined based on specific assumptions that are not identical with the real use conditions of the vSwitch in an environment where the operation conditions vary frequently such as cloud and NFV environment using 5G or later technologies. Fourth, the computing node in use for implementing the vSwitch to improve the resource utilization efficiency and cost effectiveness may often be shared with applications or virtual machines (VM). For example, a host may execute part of NFV VMs and/or applications in the course of execution of a vSwitch in a 5G environment supporting NFV. In this case, static resource allocation (e.g., CPU core isolation/reservation and memory) may cause expensive and inefficient infrastructure over-provisioning or low QoS under-provisioning.

Thus, the vSwitch may be allowed to operate in suboptimal adjustment and configuration conditions in the real use environment, even though the vSwitch may have the best adjustment and configuration.

An intelligent SDN that is capable of allocating resources dynamically in a cloud computing system, which may include an intelligent scheduler or intelligent orchestrator that observes the network environment rather than individual nodes so as to dynamically adjust (or determine) the configurations of the vSwitch and related computing hosts for optimization of the network environment, is further described below.

Figure 2:
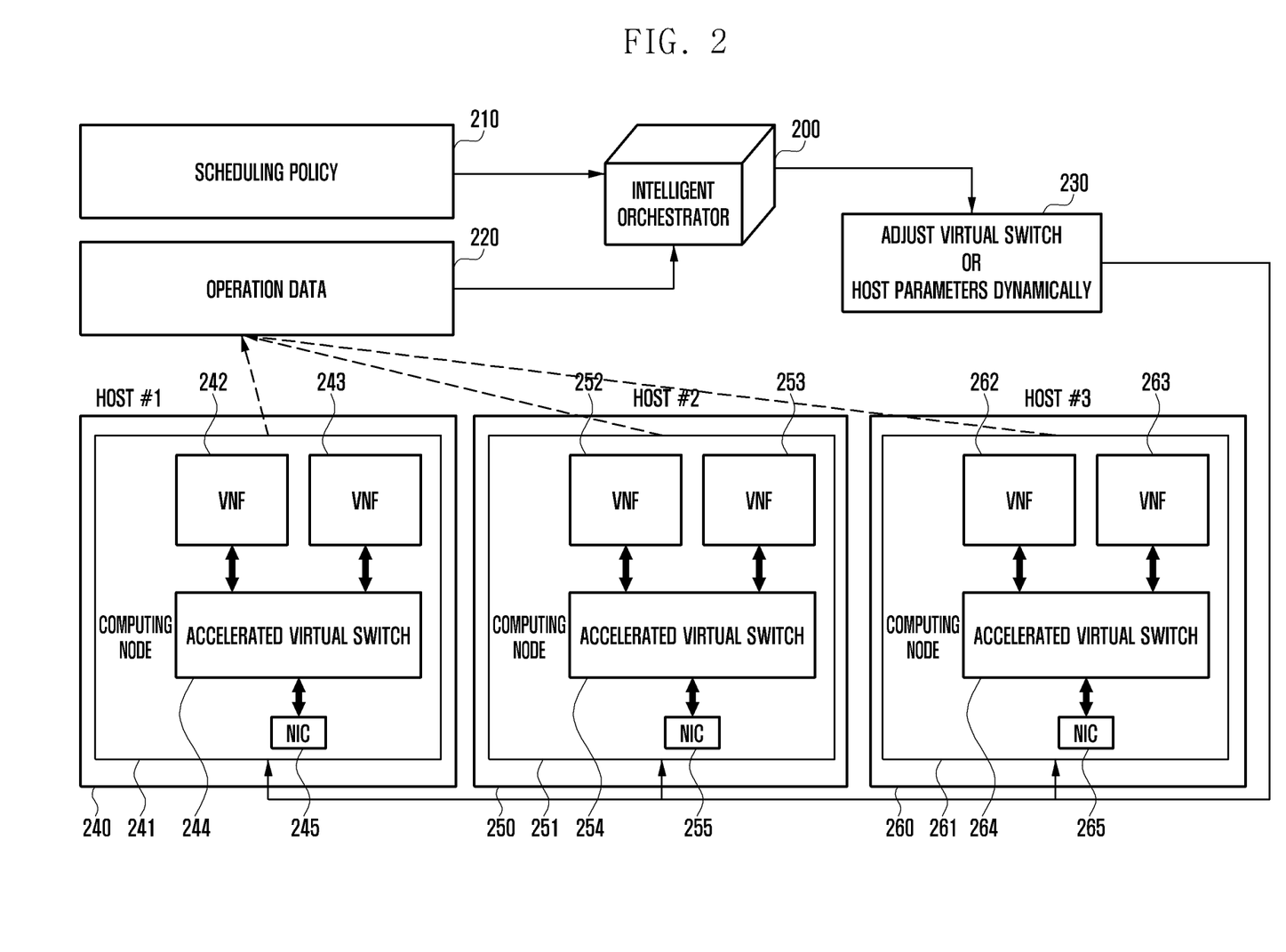
FIG. 2 is a diagram of operations of an intelligent orchestrator according to an embodiment.

FIG. 2 is a diagram of operations of an intelligent orchestrator according to an embodiment. The intelligent orchestrator may also be referred to as intelligent scheduler.

Referring to FIG. 2, the intelligent orchestrator 200 may be implemented in a data center or a cloud central office. The intelligent orchestrator 200 may also be implemented in a computing node. The intelligent orchestrator 200 may fetch configured polices such as scheduling policies 210 for a network environment. The policies 210 may be relatively static and periodically updated. The policies 210 may include, but are not limited to, QoS per voice/data, application priority, maximum and minimum resource allocation per vSwitch and application, and energy saving (integration of workload of smaller servers). The intelligent scheduler or intelligent orchestrator 200 may define and use additional policies for the network environment.

The intelligent orchestrator 200 may continuously monitor the main parameters and collect or receive operation data 220 by way of the nodes in the network environment. The operation data 220 may include, but not be limited to, packet size, packet rate, resource usage of at least one host (resource use on the hosts), resource usage and demand of the vSwitch, and resource usage/demand of at least one application or at least one VM (resource usage and demand for applications/VMs).

The intelligent orchestrator 200 may retrieve the operation data 220 from a database acquired in a scheduling procedure. The intelligent orchestrator 200 may receive the operation data 220 collected by the vSwitch. The intelligent orchestrator 200 may deploy and optimize a virtual network function (VNF) descriptor. The VNF descriptor may include network-related information, resource-related information, and metadata.

The intelligent orchestrator 200 may perform an arbitrary operation through the nodes, such as by instructing to the vSwitch or host operating system (OS), based on the operation data 220 and configured policies 210. The arbitrary operation may be performed to dynamically adjust at least one of the vSwitchs or host parameters 230. The arbitrary operation may include one of an operation of changing resource allocation between the vSwitch and an application, an operation of changing a packet buffer for an arbitrary host, and an operation of changing a resource over-commit ratio.

A host 240, 250, and 260 may include a computing node 241, 251, and 261 respectively. The computing node 241, 251, and 261 may include at least one VNF and an accelerated vSwitch 244, 254, and 264. As shown, host 240 may include computing node 241, which includes VNFs 242 and 243 as well as an accelerated vSwitch 244, host 250 may include computing node 251, which includes VNFs 252 and 253 as well as an accelerated vSwitch 254, and host 260 may include computing node 261, which includes VNFs 262 and 263 as well as an accelerated vSwitch 264.

The VNFs 242, 243, 252, 253, 262, and 263 may include a network application, a guest operating system (OS), and a virtual Input/Output (VirtIO). The VNFs may be implemented in the form of a VNF-C or VM. The accelerated vSwitches 244, 254, and 264 may include a data plane development kit (DPDK) vhost-user, an Open vSwitch+ DPDK, and a DPDK poll mode driver (PMD).

The intelligent orchestrator 200 may dynamically adjust the vSwitch or host parameter for a target host (one of the hosts 240, 250, and 260) via a network interface card (NIC). As shown, the intelligent orchestrator 200 may dynamically adjust the vSwitch or host parameter for host 240 via NIC 245, for host 250 via NIC 255, and/or for host 260 via NIC 265.

The intelligent scheduler or intelligent orchestrator 200 may operate by dynamically adjusting CPU cores available for CPU cores and application(s) isolated or reserved for vSwitch. When the packet traffic to be processed by the vSwitch is low, a small number of cores may be released from a PMD thread at an OVS-DPDK in use for application scheduling. In contrast, in the case of packet-burst, more cores may become available for operating the PMD thread. An application of a host may be migrated to another available host or move to an over-commit resource in real time.

The intelligent orchestrator 200 may also change the core assigned for executing the PMD thread depending on the characteristics of the data traffic, such as voice versus streaming data or static data object.

The intelligent orchestrator 200 may change assignment of a CPU core in a specific host according to the application and the relative priority of the packet traffic. For example, if the packet traffic increases abruptly, the orchestrator 200 may assign more cores to the PMD thread and vSwitch in comparison with batch processing tasks with a low priority. In a case where the packet size is close to 512 Bytes, the throughput does not increase as much as expected, even though the more cores are assigned to the PMD thread, and this may restrict core assignment to the PMD thread and release more cores for applications depending on the packet size (most of the arrival packets are longer than 512 Bytes).

The intelligent orchestrator 200 may dynamically adjust based on queue size. The queue size for holding data packets associated with the PMD threads may be changed or configured differently at a specific host according to attribute information (size and rate) in order to achieve a balance between latency and packet-drop rate.

The intelligent orchestrator 200 may dynamically adjust based on incoming traffic source. The intelligent orchestrator 200 may perform scheduling for assigning more resources to the vSwitch of the host, other than the resources shared with other applications, depending on whether data is received from a premium subscriber or a regular subscriber. Through this, the intelligent orchestrator 200 may dynamically divide the computing resource pool of multiple hosts between the network vSwitch and applications.

The intelligent orchestrator 200 may dynamically adjust based on packet rate. The intelligent orchestrator 200 may assign a queue per PMD thread to achieve better aggregated throughput based on the incoming packet rate per queue. For example, the PMD threads may be equally assigned to all of the port queues so as to cause inefficient core utilization and throughput degradation. In the case of applying the packet rate-based dynamic adjustment, the PMD thread is assigned to the queue based on the real packet traffic so as to make it possible to achieve efficient core utilization and high aggregate throughput.

Figure 3:
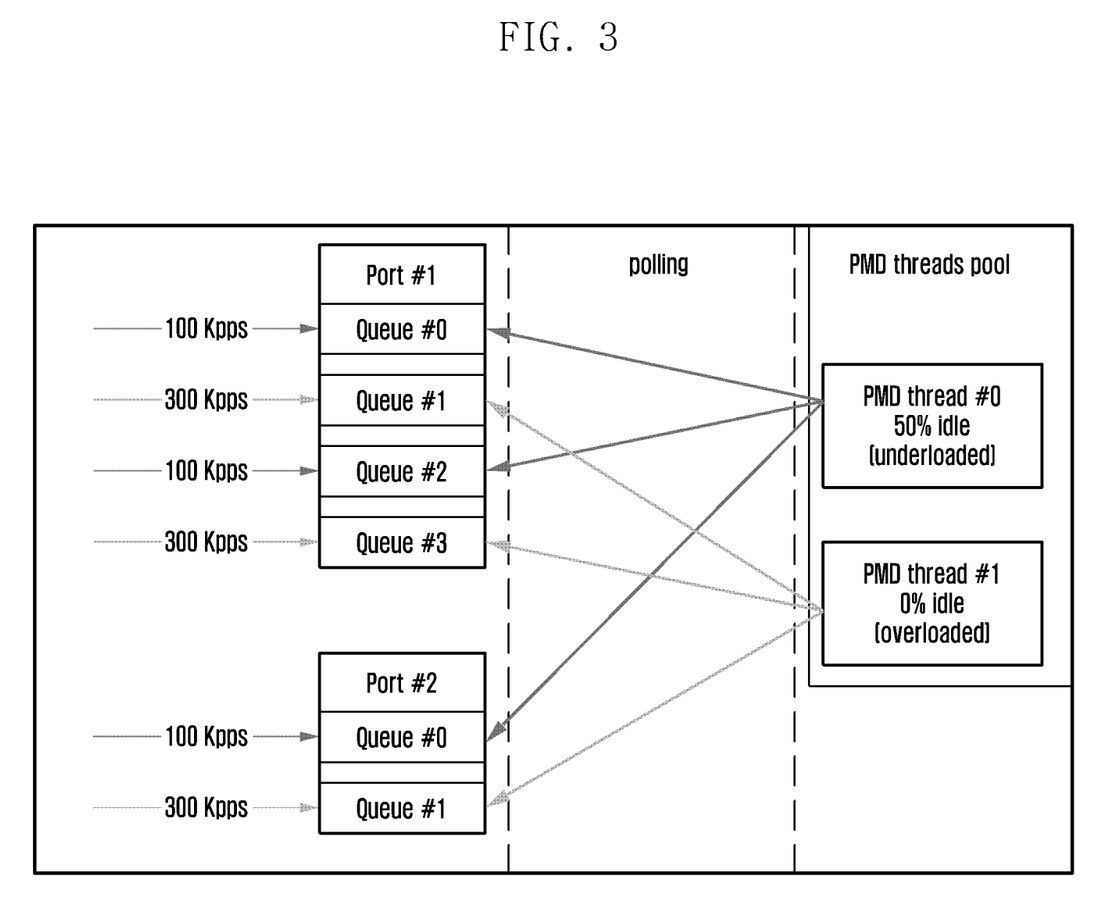
FIG. 3 is a diagram of a procedure for assigning PMD threads and queues in ports regardless of packet rate according to an embodiment.

FIG. 3 is a diagram of a procedure for assigning PMD threads and queues in ports regardless of packet rate according to an embodiment.

Referring to FIG. 3, a host may poll the queues included in the first port (port #1) and second port (port #2) by way of a PMD threads pool (PMD thread #0 and PMD thread #1).

In a conventional method, for example, the PMD thresholds pool (PMD thread #0 and PMD thread #1) polls the queues included in the first port (port #1) and the second port (port #2) one by one according to a sequence. In this case, the first PMD thread (PMD thread #0) and second PMD thread (PMD thread #1) are assigned packets of 300 kpps (100+100+100) and 900 kpps (300+300+300), respectively. Thus, it is difficult to achieve the optimal throughput of the PMD thread pool (PMD thread #0 and PMD thread #1).

Figure 4:
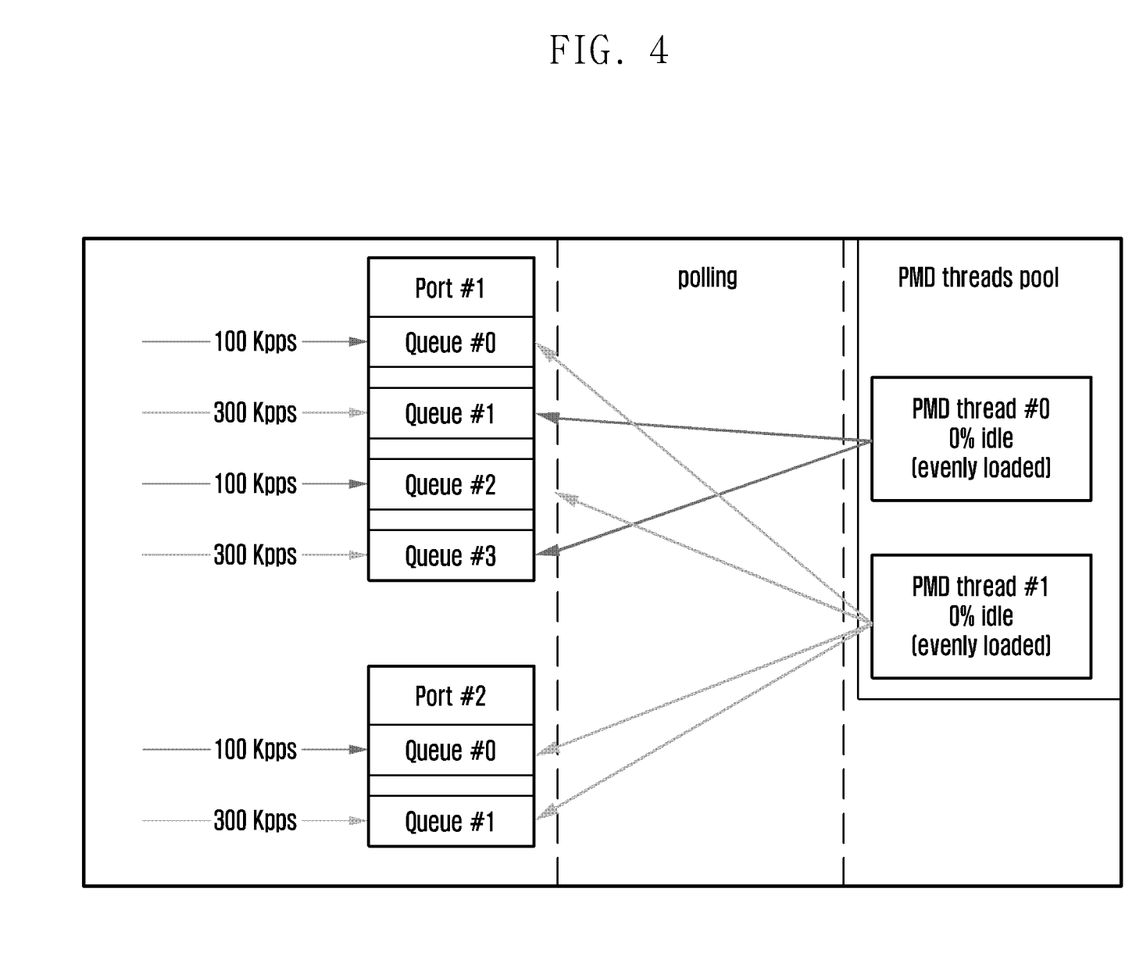
FIG. 4 is a diagram of a procedure for reassigning PMD threads and queues in ports based on a packet rate according to an embodiment.

FIG. 4 is a diagram of a procedure for reassigning PMD threads and queues in ports based on a packet rate according to an embodiment.

Referring to FIG. 4, unlike FIG. 3, a host may poll the queues included in the first port (port #1) and the second port (port #2) by means of a PMD threads pool (PMD thread #0 and PMD thread #1) in consideration of the incoming packet rates of multiple queues according to the adjustment (or control) of the intelligent orchestrator.

In this case, the first PMD thread (PMD thread #0) is assigned packets of 600 kpps (300+300) and the second PMD thread (PMD thread #1) is assigned packets of 600 kbps (100+100+100+300) so as to achieve the optimal throughput of the PMD thread pool (PMD thread #0 and PMD thread #1).

Figure 5:
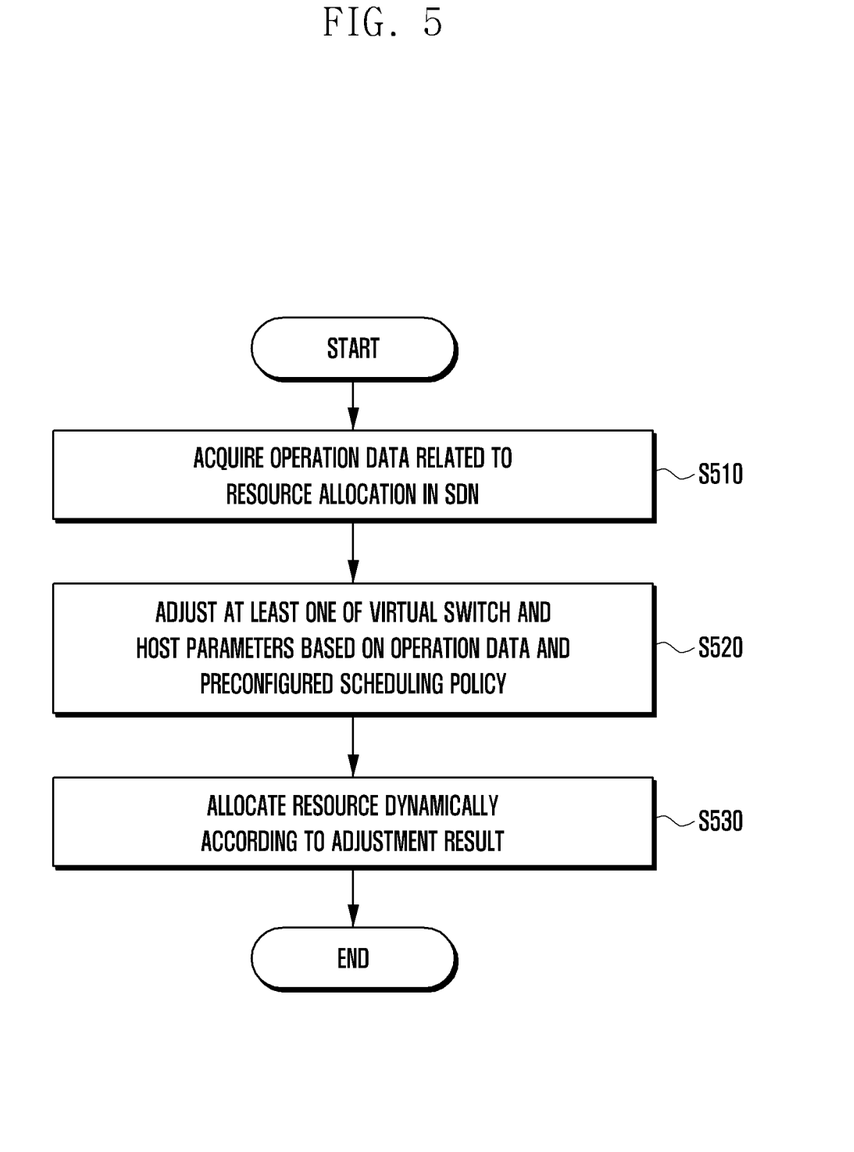
FIG. 5 is a flowchart of an operation method of an intelligent orchestrator according to an embodiment.

FIG. 5 is a flowchart of an operation method of an intelligent orchestrator according to an embodiment.

Referring to FIG. 5, at step S510, the intelligent orchestrator may acquire operation data related to resource allocation in an SDN. The operation data may include at least one of packet size, packet rate, resource usage and demand of the host, resource usage and demand of the virtual switch, and resource usage and demand of the application.

At step S520, the intelligent orchestrator may adjust at least one of a virtual switch (vSwitch) and host parameters based on the operation data and preconfigured scheduling policy. The virtual switch may perform a function of connecting the SDN and the host, and the host parameters may include the parameter related to the resource allocation of the host. The scheduling policy may include at least one of QoS per data, priority per application, subscriber information-related policy, minimum and maximum resource allocation amounts per vSwitch, and minimum and maximum resource allocation amounts per application. The scheduling policy may be predetermined by the SDN or defined and generated according to requirements of the SDN.

At step S530, the intelligent orchestrator may dynamically allocate resources according to the result of the adjustment of step S520. The intelligent orchestrator may change the resource allocation ratio between the vSwitch and application according to the adjustment result, change the packet buffer for an arbitrary host according to the adjustment result, and/or change the over-commit ratio for the resources according to the adjustment result.

The intelligent orchestrator may adjust at least one core in use for scheduling the application according to the packet traffic being processed by the vSwitch. The intelligent orchestrator may reduce the number of the cores in the case where the packet traffic being processed by the vSwitch is low and increase the number of the cores in the case where the packet traffic being processed by the vSwitch is high.

The intelligent orchestrator may adjust the size of the queue that holds the packet based on the attribute information of the packet. The attribute information of the packet may include packet size and packet rate.

The intelligent orchestrator may assign each PMD thread to a respective queue of multiple queues, based on the packet rate. For example, the intelligent orchestrator may assign the PMD threads to the queues so as to maximize the whole PMD threads processing amount in consideration of the incoming packet rates of the queues rather than assigning the PMD threads to the queues according to a predetermined assignment relationship.

The intelligent orchestrator may be implemented in the data center or the computing nodes inside the host. The intelligent orchestrator may be implemented in the cloud central office.

Figure 6:
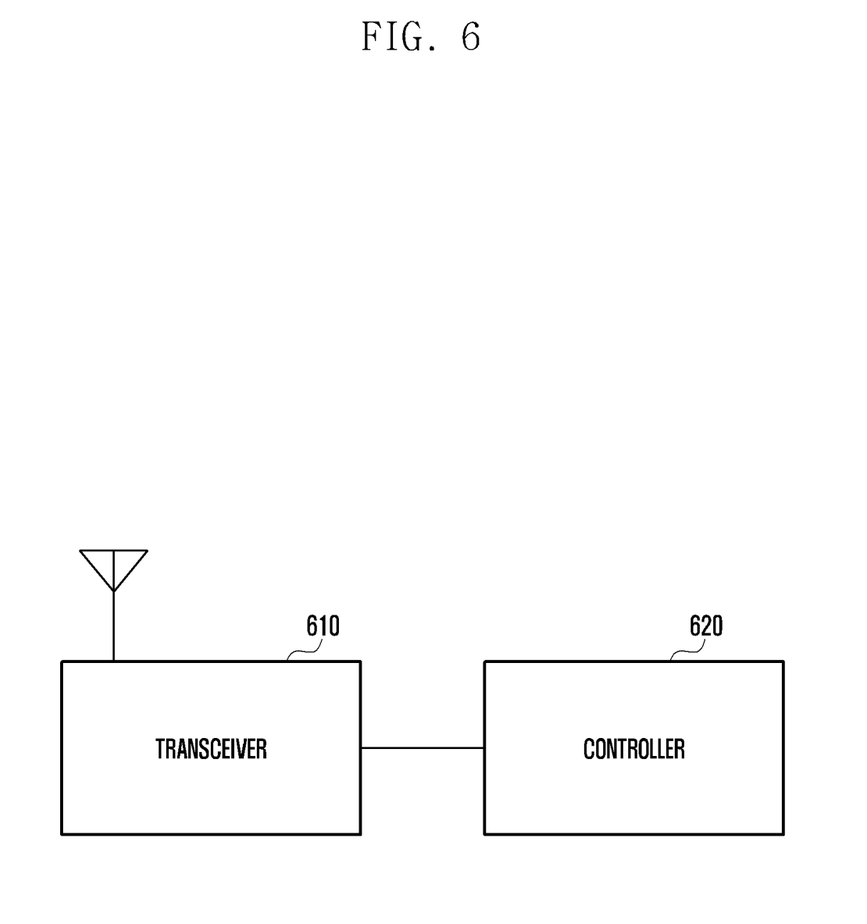
FIG. 6 is a diagram of a configuration of an intelligent orchestrator according to an embodiment.

FIG. 6 is a diagram of a configuration of an intelligent orchestrator according to an embodiment.

Referring to FIG. 6, the intelligent orchestrator may include a transceiver 610 for communicating signals with another device and a controller 620 for controlling the transceiver 610 and performing (or providing) the methods disclosed herein.

The controller 620 may acquire operation data related to resource allocation, adjust at least one of a vSwitch and host parameters based on the operation data and a preconfigured scheduling policy, and allocate resources dynamically according to the adjustment result. The controller 620 may perform the operations disclosed herein that have been described with reference to FIGS. 1 to 5.

As described above, the dynamic resource allocation method and apparatus of the present invention is advantageous in terms of improving resource utilization and cost effectiveness by adjusting (or configuring) a vSwitch to be optimized in consideration of the whole network environment of a software-defined network.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A dynamic resource allocation method of an intelligent orchestrator in a software-defined network (SDN), the dynamic resource allocation method comprising:
transmitting and receiving signals by a hardware transceiver;
acquiring, by a hardware controller, operation data related to resource allocation in the SDN;
adjusting, by the hardware controller, a virtual switch and a host parameter based on the acquired operation data and a preconfigured scheduling policy, the virtual switch connecting the SDN and a host; and
allocating, by the hardware controller, resources dynamically by changing a packet buffer for an arbitrary host and a resource allocation ratio between the virtual switch and an application included in the host according to a result of the adjustment,
wherein changing, by the hardware controller, the packet buffer comprises assigning multiple queues to respective poll mode driver (PMD) threads based on a packet rate, and
wherein allocating, by the hardware controller, the resources further comprises adjusting at least one core in use for scheduling the application according to an amount of packet traffic being processed by the virtual switch.

2. The method of claim 1, wherein the operation data comprises at least one of packet size, packet rate, resource usage and demand of hosts, resource usage and demand of virtual switches, and resource usage and demand of applications.

3. The method of claim 1, wherein the scheduling policy comprises at least one of quality of service (QoS) per data, priority per application, subscriber information-related policy, minimum and maximum resource allocation amounts per virtual switch, and minimum and maximum resource allocation amounts per application.

4. The method of claim 1, wherein allocating the resources further comprises:
changing an over-commit ratio for the resources according to the result of the adjustment.

5. The method of claim 1, wherein changing the packet buffer comprises adjusting a size of a queue holding the packet based on attribute information of the packet.

6. The method of claim 1, wherein the intelligent orchestrator is implemented in a data center or a computing node in a host.

7. An intelligent orchestrator system for dynamically assigning resources in a software-defined network (SDN), the intelligent orchestrator system comprising:

a hardware transceiver configured to transmit and receive signals; and a hardware controller configured to acquire operation data related to resource allocation in the SDN, adjust a virtual switch and a host parameter based on the acquired operation data and a preconfigured scheduling policy, the virtual switch connecting the SDN and a host, and allocate resources dynamically by changing a packet buffer for an arbitrary host and a resource allocation ratio between the virtual switch and an application included in the host according to a result of the adjustment, wherein the hardware controller is further configured to change the packet buffer by assigning multiple queues to respective poll mode driver (PMD) threads based on a packet rate and allocate the resources by adjusting at least one core in use for scheduling the application according to an amount of packet traffic being processed by the virtual switch.

8. The intelligent orchestrator of claim 7, wherein the operation data comprises at least one of packet size, packet rate, resource usage and demand of hosts, resource usage and demand of virtual switches, and resource usage and demand of applications.

9. The intelligent orchestrator of claim 7, wherein the scheduling policy comprises at least one of quality of service (QoS) per data, priority per application, subscriber information-related policy, minimum and maximum resource allocation amounts per virtual switch, and minimum and maximum resource allocation amounts per application.

10. The intelligent orchestrator of claim 7, wherein the controller is further configured to change:

an over-commit ratio for the resources according to the result of the adjustment.

11. The intelligent orchestrator of claim 7, wherein the controller is further configured to adjust a size of a queue holding the packet based on attribute information of the packet.

* * * * *